(12) United States Patent
Williams et al.

(10) Patent No.: US 10,610,743 B2
(45) Date of Patent: Apr. 7, 2020

(54) APPARATUS AND METHOD FOR STRINGING A LACROSSE HEAD

(71) Applicant: Cascade Maverik Lacrosse, LLC, Exeter, NH (US)

(72) Inventors: David Williams, Fulton, NY (US); David Winthrop Fream, Newfields, NH (US); Geof Legg, Newburyport, MA (US); Nicholas Colville, Syracuse, NY (US); Michael Chmelik, Manilus, NY (US)

(73) Assignee: Cascade Maverik Lacrosse, LLC, Exeter, NH (US)

(*) Notice: Subject to any disclaimer, the term of this patent is extended or adjusted under 35 U.S.C. 154(b) by 0 days.

(21) Appl. No.: 16/215,165

(22) Filed: Dec. 10, 2018

(65) Prior Publication Data
US 2019/0175994 A1  Jun. 13, 2019

Related U.S. Application Data

(60) Provisional application No. 62/597,166, filed on Dec. 11, 2017.

(51) Int. Cl.
| | |
|---|---|
| *A63B 51/14* | (2006.01) |
| *A63B 59/20* | (2015.01) |
| *B25J 15/00* | (2006.01) |
| *B25J 9/16* | (2006.01) |
| *B25J 9/00* | (2006.01) |

(Continued)

(52) U.S. Cl.
CPC .............. *A63B 51/14* (2013.01); *A63B 59/20* (2015.10); *B25J 9/0087* (2013.01); *B25J 9/1682* (2013.01); *B25J 11/00* (2013.01); *B25J 15/0019* (2013.01); *A63B 2102/14* (2015.10)

(58) Field of Classification Search
CPC ..... A63B 51/14; A63B 59/20; A63B 2102/14; B25J 9/1682; B25J 15/0019
See application file for complete search history.

(56) References Cited

U.S. PATENT DOCUMENTS 9,427,642 B2* 8/2016 Morrow .................... D05B 1/02
9,821,455 B1* 11/2017 Bareddy ................ B25J 9/0084
(Continued)

OTHER PUBLICATIONS

Ruggiero, Six-Minute Shoes: Keen Robot Builds UNEEKS In-Store. GearJunkie. Aug. 1, 2017. https://gearjunkie.com/keen-robot-builds-uneek-shoes [last accessed Jul. 29, 2019]. 9 pages.

*Primary Examiner* — Jeffrey S Vanderveen
(74) *Attorney, Agent, or Firm* — Wolf, Greenfield & Sacks, P.C.

(57) ABSTRACT

A robotic manipulator is used to control the forces and angles applied on the strings during stringing of a lacrosse head. Precise string lengths may be implemented for certain features of the pocket. In some embodiments, the manipulator attaches the pocket to a lacrosse head and produces a strung head which has precise ratios of tension when comparing various strings within the pocket. One or more robot arms with end effectors such as grippers may be used. The forces used when tying each knot can be consistent throughout the pocket, or vary according to which particular knot is being tied. The tension of shooting strings and/or runners may be finely tuned in some embodiments.

15 Claims, 4 Drawing Sheets

(51) Int. Cl.
 *B25J 11/00* (2006.01)
 *A63B 102/14* (2015.01)

(56) References Cited

U.S. PATENT DOCUMENTS

2016/0332301 A1* 11/2016 Kesil ................ H01L 21/68707
2017/0340934 A1* 11/2017 Kohler ................ A63B 59/20

* cited by examiner

APPARATUS AND METHOD FOR STRINGING A LACROSSE HEAD

RELATED APPLICATION

This application claims the benefit under 35 U.S.C. § 119(e) to U.S. Provisional Application Ser. No. 62/597,166, entitled "APPARATUS AND METHOD FOR STRINGING A LACROSSE HEAD", filed on Dec. 11, 2017, which is hereby incorporated by reference in its entirety.

FIELD

The present disclosure relates generally to automated methods and apparatus for stringing lacrosse heads, and more specifically to stringing a lacrosse head with at least one robotic arm.

DISCUSSION OF RELATED ART

Stringing a lacrosse head by hand requires experience and can take approximately thirty minutes. Players are often hesitant to have their lacrosse heads re-strung when a pocket nears its end of usable life because the new pocket may vary from the current pocket unless strung by the same person in the same manner.

SUMMARY

According to one embodiment, a lacrosse head stringing system includes a first robotic arm having a first gripper, a second robotic arm having an end effector, and a controller including a set of instructions configured to control the first gripper and the end effector to manipulate one or more strings to form a lacrosse pocket that is attached to a lacrosse head.

According to another embodiment, a method of stringing a lacrosse head using a robotic manipulator is provided. The robotic manipulator comprising a first end effector configured to manipulate a first string portion, and a second end effector configured to manipulate a second string portion. The method includes controlling the first end effector to manipulate a first string portion through a first opening in a sidewall of the lacrosse head, controlling the second end effector to pull a second string portion away from the sidewall to form an opening between the second string portion and the sidewall, and controlling the first end effector to manipulate the first string portion through the opening between the second string portion and the sidewall.

According to a further embodiment, a method of attaching a mesh pocket to a lacrosse head using a robotic manipulator is provided. The robotic manipulator includes an end effector and a first gripper, the first gripper being configured to grip and manipulate a first portion of a string. The method includes controlling the first gripper to manipulate a first string portion through a first opening in a sidewall of the lacrosse head, and through a first opening in the mesh pocket. The method also includes controlling the end effector to separate a portion of a perimeter of the first mesh pocket opening from a second portion of the string. Further acts include controlling the first gripper to manipulate the first string portion between the portion of the perimeter of the first mesh pocket opening and the second portion of the string gripper, and controlling the first gripper to manipulate the first string portion through a second opening the sidewall of the lacrosse head.

In another embodiment, an apparatus includes a lacrosse head having a first sidewall and an opposite second sidewall, a pocket attached to the lacrosse head with a plurality of strings which pass through sidewall openings, and a first string of the plurality of strings, the first string extending inwardly from a first sidewall opening on the first sidewall. The apparatus also includes a second string extending inwardly from a second sidewall opening on the second, opposite sidewall, the second sidewall opening being directly opposite the first sidewall opening. The first and second string have the same applied tension when the pocket is in a resting state.

BRIEF DESCRIPTION OF DRAWINGS

Aspects of the invention are described below, by way of example, with reference to the accompanying drawings in which like numerals reference like elements, and wherein.

DETAILED DESCRIPTION

Figure 1:
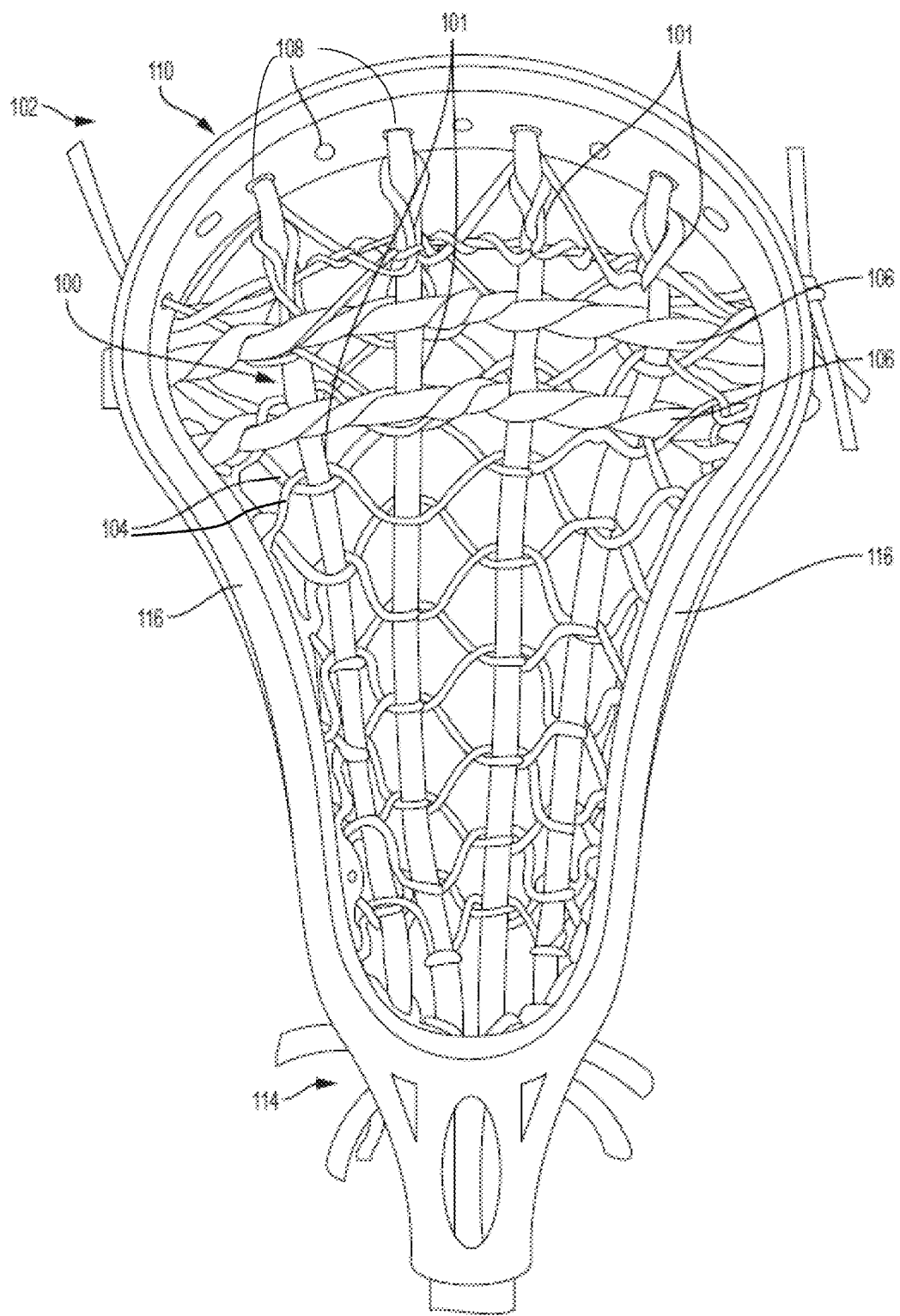
FIG. 1 is a front view of a lacrosse head strung using embodiments disclosed herein.

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Lacrosse players become accustomed to the shape and feel of their lacrosse head pocket, and replacing the pocket can change the shape and feel because a new pocket is not as broken-in as the pocket being replaced. Additionally, the new pocket may not be strung in the same manner as the old pocket, further altering the feel of the pocket. In an attempt to maintain as much consistency as possible, the player may have the same person string the new pocket, though restricting the stringing to a single person may cause scheduling difficulties.

Even if the same person strings the new pocket and uses the same materials as the old pocket, there can be variation in the results because many aspects factor into the final pocket configuration. For example, the distances between knots, the force applied when tying each knot, and/or the tension in the strings connecting the pocket to the head may play a role in the final pocket configuration. Additionally, explaining particular desires to a stringer with the necessary level of precision can be difficult, and a stringer may have difficulty remembering how a pocket was previously strung for a given person.

When manufacturing a new pocket and/or attaching a pocket to a lacrosse head, consistency from pocket-to-pocket can be important. For example, if a particular line of lacrosse heads has three different models, each with a different level of pocket tension, controlling the amount of tension in each of the models to within certain tight tolerances may be important. Additionally, controlling tension and/or string lengths within a single pocket may be important for producing a strung lacrosse head that is tuned in a desired manner. For example, it may be desirable to produce a head/pocket combination that is symmetric about a longitudinal axis of the head. Or, for some lacrosse heads, an asymmetry in the tension of certain areas of the pocket may be desired, and the desired tensions are achievable to within certain limits by using a robotic manipulator.

According to the present disclosure, by using a robotic manipulator, such as robotic arms, the forces and angles applied on the strings during stringing of a lacrosse head may be controlled, and precise string lengths may be implemented for certain features of the pocket. In some embodiments, the manipulator attaches the pocket to a lacrosse head and produces a strung head which has precise ratios of tension when comparing various strings within the pocket. The forces used when tying each knot can be consistent throughout the pocket, or vary according to which particular knot is being tied. The tension of shooting strings and/or runners may be finely tuned in some embodiments.

Turning to the figures, FIG. 1 shows a traditionally-strung conventional lacrosse head 102 including a pocket 100 comprising longitudinal runners 101, cross-lacing 104, and shooting strings 106. The longitudinal runners 101 are attached to openings 108 in a scoop end 110 of the head 100, and also to openings (not shown in FIG. 1) at a ball stop end 114. Sidewalls 116 of the head 100 include openings (not shown in FIG. 1) which are used to secure the cross-lacing 104 and the shooting strings 106 to the head 100. The runners 102 may be formed with leather or any other suitable material.

According to the present disclosure, some or all of the cross-lacing 104, longitudinal runners 101, and shooting strings 106 may be interwoven by a programmed mechanical manipulator such as one or more robotic arms.

Figure 2:
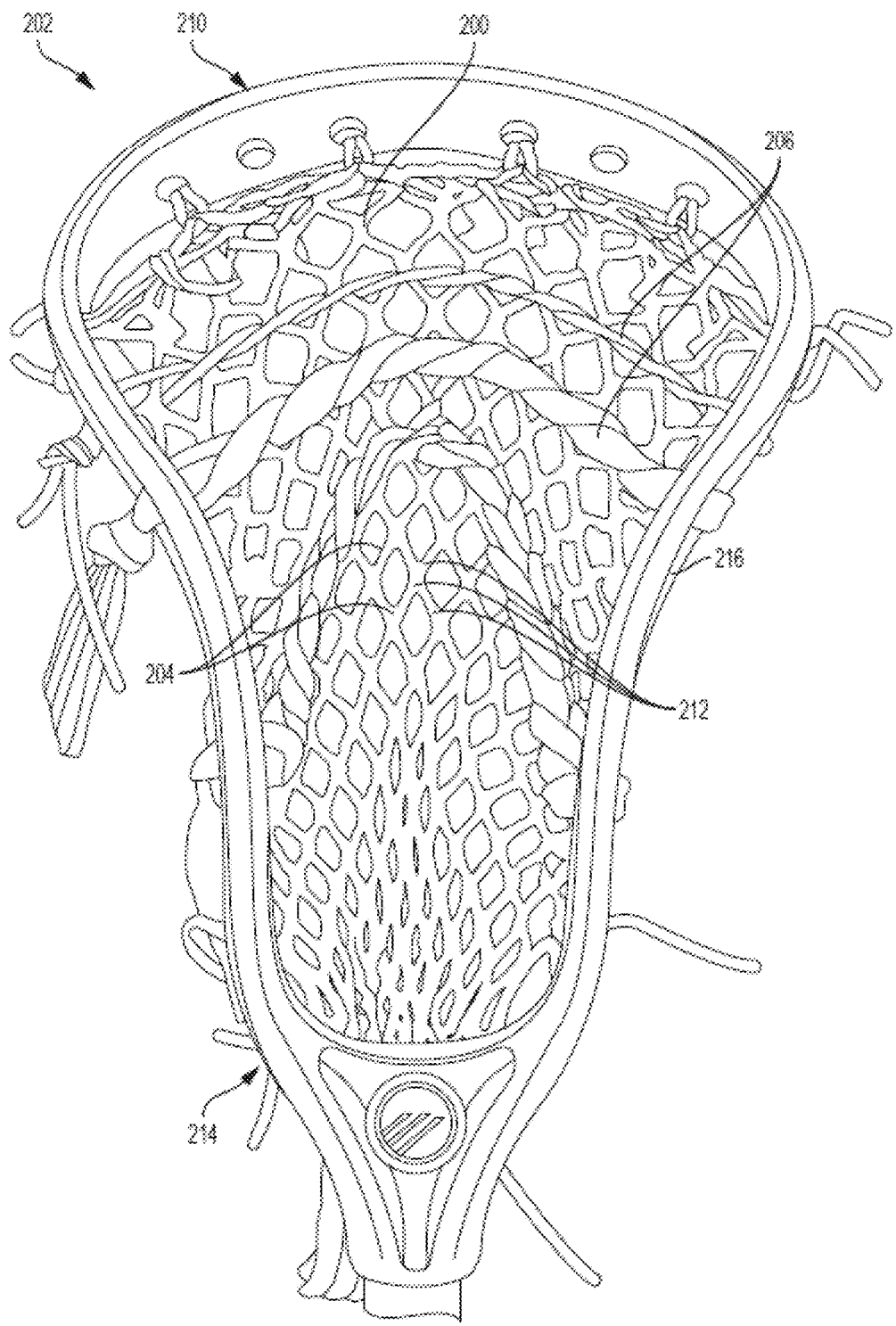
FIG. 2 is a front view of a mesh pocket which has been attached to a lacrosse head using embodiments disclosed herein.

FIG. 2 shows a mesh pocket 200 attached to a lacrosse head 202. The mesh includes strands 204 which intersect at nodes 212. The mesh material typically includes fibers made of one or more of nylon, polyester, and composite materials. The mesh is attached to sidewalls 216 of the head, a scoop end 210 of the head, and a ball stop end 214 of the head. Shooting strings 206 may be woven through the mesh. According to embodiments disclosed herein, the attachment of the mesh pocket 200 to the sidewalls 216 may be achieved using one or more robotic arms. In some embodiments, the shooting strings 206 may be woven using robotic arms.

Figure 3:
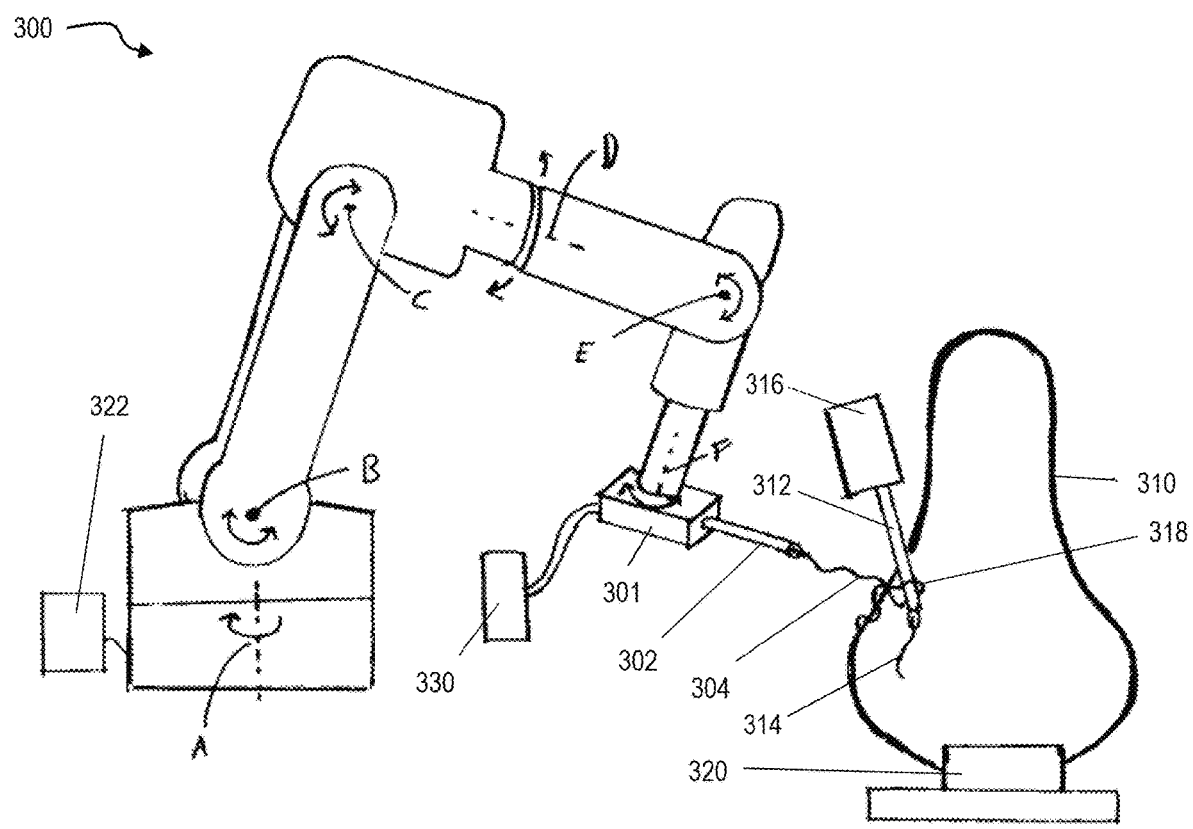
FIG. 3 shows one embodiment of a robotic arm system according to one embodiment.

FIG. 3 shows a robotic arm 300 with an end effector 301 having a hollow needle 302 through which a string 304 may be fed. The needle 302 pushes or pulls the string 304 to loop the string around another string being manipulated by a second robotic arm. The needle 302 also may be used to push the string 304 through an opening in a lacrosse head 308. A second hollow needle 312 and a second string 314 may be manipulated by a second robotic arm (not shown). Once the first needle 308 is through the opening, the second needle may be inserted between the first string and the needle such that when the first needle is retracted through the opening, the second string is captured in a loop 316 formed by the first string. Similar manipulations may be operated around the sidewall and/or scoop of the lacrosse head 308 to attached the pocket to the head.

Needles other than hollow needles may be used in some embodiments. For example, in some embodiments, a needle sidewall or other instrument may be used to push a string portion. The needle may be moved along its length next to and perpendicular to a string, and then moved sideways such that the needle sidewall pushes the string.

In the illustrated embodiment, robotic arm 300 is formed of six revolute joints which form a first rotation axis A, a second rotation axis B, a third rotation axis C, a fourth rotation axis D, a fifth rotation axis E, and a sixth rotation axis F. This arrangement allows first needle 302 to reach any location within a working envelope. Programmed manipulators having five degrees of freedom may be used in some embodiments, and programmed manipulators having six degrees of freedom may be used in some embodiments. Additional, redundant axes of rotation may be added to allow the robotic arm to achieve a given position using more than one set of revolute joint rotations. Fewer degrees of freedom may be used by certain components in some embodiments. For example, a needle may be operated to move only forward and backward while a lacrosse head is progressively moved to position various openings to align with the needle.

A controller 322 is connected to robotic arm 300 and any other robotic arms in some embodiments. The controller receives instructions for operating the robotic arm(s) to string lacrosse heads. The controller may include a single, dedicated set of instructions such that the system repeatedly strings lacrosse heads in the same manner. Or, in other embodiments, the controller may receive multiple different sets of instructions such that the system strings the same type of lacrosse head in different manner, or strings different types of lacrosse heads.

The end effector of one or both robotic arms may include an instrument other than a hollow needle. One or more clamping grippers may be provided in some embodiments. Various interchangeable end effector instruments may be provided, and the robotic manipulators may change end effector instruments during or between head stringing. The change of end effector instruments may be performed automatically or manually.

Kinematic chains which are different than the illustrated embodiment may be used in methods and robot configurations that string lacrosse head pockets. Various arrangements of hinged joints and sliding joints may be used.

Figure 4:
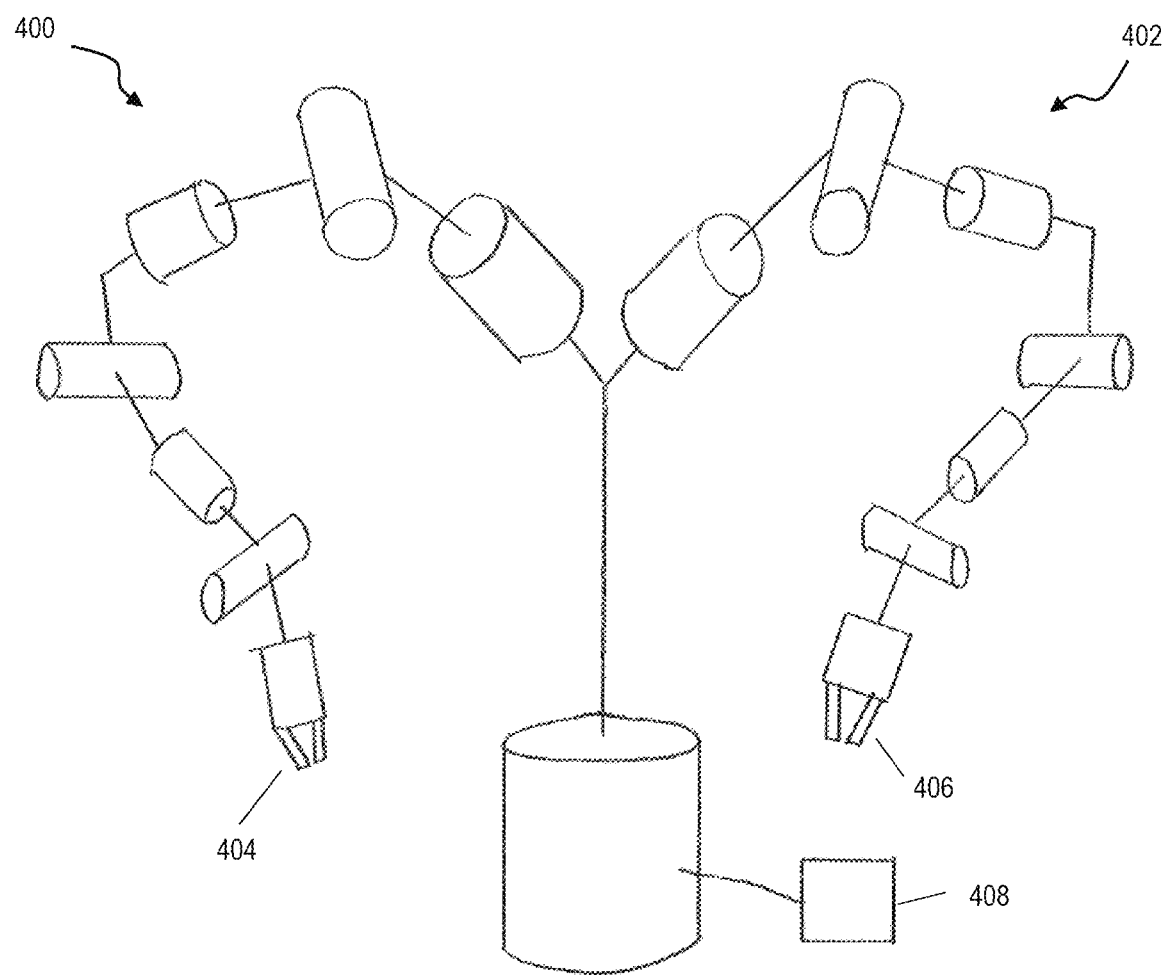
FIG. 4 is a kinematic diagram of a dual robotic arm system according to one embodiment.

FIG. 4 is a kinematic diagram of one example of first and second robotic arms 400, 402 which may be used to string a lacrosse head. Each cylinder represents a revolute joint. Each arm 400, 402 may be a five-axis, six-axis, or seven-axis arm in various embodiments. In some embodiments, an ABB dual arm YuMi® robot may be used to string a lacrosse head. The robotic arms may include grippers 404, 406 for end effectors in some embodiments. The grippers may resemble needle-nose pliers in some embodiments.

In some embodiments, a controller 408 is programmed to control the first gripper 404 to grip a first string portion near an end of the string, and manipulate the string through a series of loops and knots. The second gripper 406 is controlled to progressively grip other portions of the same string to form loops (or other shapes) through which the first gripper 404 moves the first string portion.

For example, in one embodiment, the first gripper pushes a first end of a string through a first opening in a lacrosse head sidewall from the outside of the sidewall to the inside of the sidewall, releases the string, and then re-grips the string on the inside of the sidewall. The first gripper pulls the string all the way through the sidewall opening until a knotted end abuts an exterior of the sidewall. The first gripper then passes the string end through an opening in a lacrosse pocket (such as a mesh pocket) and then around a bottom side of the sidewall, and pushes the first string end through a second sidewall opening from the outside to the inside. At this point, the second gripper grips the string portion that is abutting the bottom of the sidewall and pulls the string portion away from the sidewall to form the space between the string of the sidewall. The first gripper then passes the first string end through the space and pulls the remainder of the string through the loop. The first gripper then brings the first end to a third sidewall opening and repeats the process. In this manner, the first and second robotic arms 400, 402 may attach a previously-formed pocket to a lacrosse head.

In some embodiments the first and second grippers may be controlled to form the pocket itself by interweaving one or more strings in a programmed pattern. For example, one or more strings may be looped through openings extending from pre-formed runners. Or, a first string may be interwoven with a second string to from a complete pocket, and runners and/or shooting strings may be added manually or by using the robotic arms. In some embodiments, a single string is woven using the first and second grippers to form a pocket. The strings may include aglets or hardened ends to facilitate movement through openings. According to some embodiments, a third robotic arm (not shown) may be used to hold and reorient the lacrosse head.

Precise and repeatable forces may be applied to the strings by the robotic manipulators during pocket manufacture such that the resulting pocket has prescribed tension in certain areas of the pocket, with the tensions falling within a small tolerance range. Similarly, lengths of the string between knots between knots, loops, openings, etc. may be precisely controlled according to some embodiments herein. For example, within a given strung lacrosse head, various string lengths which are supposed to be of similar length may vary from each other by less than 1% in some embodiments. In some embodiments, the direction of force applied to the string by the gripper or other end effector may be precisely controlled to produce repeatable results.

In a similar manner, systems described herein may produce strung lacrosse heads which have consistent pocket shapes and tensions from head-to-head.

Custom pockets may be strung according to embodiments disclosed herein. For example, a standard set of stringing instructions may be provided for a given type of lacrosse head, and modifications to the instructions may be made based on user input. A user may provide input regarding pocket location, string tension, string color, and other parameters. An algorithm then may modify the set of instructions sent to the controller.

Spools of string to be used to string the pocket may be provided, and the robotic arms may be controlled to select one or more spools during pocket stringing. In some embodiments, a user may select which color or colors to be used to string the pocket. Examples of materials that may be used for stringing a lacrosse that include nylon, polyester, polyethylene, cotton, and any other suitable material.

The systems and methods described herein may be used to string goalie sticks as well.

For purposes of this patent application and any patent issuing thereon, the indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

The use of "including," "comprising," "having," "containing," "involving," and/or variations thereof herein, is meant to encompass the items listed thereafter and equivalents thereof as well as additional items.

It should also be understood that, unless clearly indicated to the contrary, in any methods claimed herein that include more than one step or act, the order of the steps or acts of the method is not necessarily limited to the order in which the steps or acts of the method are recited.

The foregoing description of various embodiments are intended merely to be illustrative thereof and that other embodiments, modifications, and equivalents are within the scope of the invention recited in the claims appended hereto.

What is claimed is:

1. A lacrosse head stringing system comprising:
a first robotic arm having a first gripper;
a second robotic arm having an end effector;
a controller including a set of instructions configured to control the first gripper and the end effector to manipulate one or more strings to form a lacrosse pocket that is attached to a lacrosse head;
a first string extending inwardly from a first sidewall opening on a first sidewall; and
a second string extending inwardly from a second sidewall opening on a second, opposite sidewall, the first sidewall opening being directly opposite the second sidewall opening; wherein
the controller is configured to control the first gripper and the end effector such that in the formed lacrosse pocket, the first string has the same tension as the second string.

2. A lacrosse head stringing system as in claim 1, wherein the end effector comprises a second gripper.

3. A lacrosse head stringing system as in claim 2, wherein the end effector comprises a needle.

4. A lacrosse head stringing system as in claim 1, wherein the first robotic arm has at least five axes.

5. A lacrosse head stringing system as in claim 1, wherein the first robotic arm has at least six axes.

6. A method of stringing a lacrosse head using a robotic manipulator, the robotic manipulator comprising a first end effector configured to manipulate a first string portion, and a second end effector configured to manipulate a second string portion, the method comprising:
controlling the first end effector to manipulate a first string portion through a first opening in a sidewall of the lacrosse head;
controlling the second end effector to pull a second string portion away from the sidewall to form an opening between the second string portion and the sidewall; and
controlling the first end effector to manipulate the first string portion through the opening between the second string portion and the sidewall.

7. A method as in claim 6, wherein the first end effector comprises a gripper.

8. A method as in claim 6, wherein the second end effector comprises a needle.

9. A method as in claim 6, further comprising securing the lacrosse head to a working surface.

10. A lacrosse head comprising a strung pocket formed according to the method of claim 6.

11. A method of attaching a mesh pocket to a lacrosse head using a robotic manipulator, the robotic manipulator comprising an end effector and a first gripper, the first gripper configured to grip and manipulate a first portion of a string, the method comprising:

controlling the first gripper to manipulate a first string portion through a first opening in a sidewall of the lacrosse head, and through a first opening in the mesh pocket;

controlling the end effector to separate a portion of a perimeter of the first mesh pocket opening from a second portion of the string;

controlling the first gripper to manipulate the first string portion between the portion of the perimeter of the first mesh pocket opening and the second portion of the string gripper; and controlling the first gripper to manipulate the first string portion through a second opening the sidewall of the lacrosse head.

12. A method as in claim 11, wherein the end effector comprises a second gripper.

13. A method as in claim 11, wherein the end effector comprises a needle.

14. A method as in claim 11, wherein after controlling the first gripper to manipulate the first string portion between the portion of the perimeter of the first mesh pocket opening and the second portion of the string, the first gripper pulls on the first string portion with an assigned force before manipulating the first string portion through the second opening the sidewall of the lacrosse head.

15. A method as in claim 14, further comprising:

controlling the first gripper to manipulate the first string portion through a second opening in the mesh pocket;

controlling the end effector to separate a portion of a perimeter of the second mesh pocket opening from a third portion of the string;

controlling the first gripper to manipulate the first string portion between the portion of the perimeter of the second mesh pocket opening and the third portion of the string; and controlling the first gripper to pull on the first string portion with the same assigned force.

* * * * *